(12) United States Patent
Heath

(10) Patent No.: US 9,936,209 B2
(45) Date of Patent: Apr. 3, 2018

(54) SYSTEM AND METHOD FOR SLICE PROCESSING COMPUTER-RELATED TASKS

(71) Applicant: The Quantum Group Inc., West Palm Beach, FL (US)

(72) Inventor: Chester Heath, Boca Raton, FL (US)

(73) Assignees: THE QUANTUM GROUP, INC., Lake Worth, FL (US); Noel J. Guillama, Wellington, FL (US)

( * ) Notice: Subject to any disclaimer, the term of this patent is extended or adjusted under 35 U.S.C. 154(b) by 10 days.

(21) Appl. No.: 14/810,893

(22) Filed: Jul. 28, 2015

(65) Prior Publication Data

US 2015/0331803 A1 Nov. 19, 2015

Related U.S. Application Data

(63) Continuation-in-part of application No. 13/572,164, filed on Aug. 10, 2012, now Pat. No. 9,092,348.
(Continued)

(51) Int. Cl.
| | |
|---|---|
| *G06F 12/08* | (2016.01) |
| *G06F 15/78* | (2006.01) |
| *H04N 19/423* | (2014.01) |
| *H04N 19/436* | (2014.01) |
| *G06F 12/0868* | (2016.01) |
| *G06F 12/0877* | (2016.01) |

(Continued)

(52) U.S. Cl.
CPC ....... *H04N 19/423* (2014.11); *G06F 12/0868* (2013.01); *G06F 12/0877* (2013.01); *G06F 12/0893* (2013.01); *G06F 12/0895* (2013.01); *G06F 15/7821* (2013.01); *H04N 19/436* (2014.11)

(58) Field of Classification Search
CPC ............ G06F 12/0868; G06F 12/0877; G06F 12/0893; G06F 12/0895; G06F 15/7821; H04N 19/423; H04N 19/436
See application file for complete search history.

(56) References Cited

U.S. PATENT DOCUMENTS 6,333,929 B1 * 12/2001 Drottar ................. H04L 1/0057
370/362
6,862,675 B1 * 3/2005 Wakimoto ............ G06F 9/3802
711/123
(Continued)

*Primary Examiner* — Aracelis Ruiz
(74) *Attorney, Agent, or Firm* — Nixon Peabody LLP; Eduardo J. Quinones

(57) ABSTRACT

Methods and systems therefrom are provided for task processing in a computing environment. The method includes identifying a program to be executed by a processor for performing at least one task and determining that a memory requirement for the program does not exceed a capacity of a cache memory for the processor to perform the task. The method also includes, in response to determining that the memory requirement for the program does not exceed the capacity of the cache memory, instructing the processor to enter into a slice mode from a current mode and execute the program in the slice mode to perform the task. In the method, the slice mode comprises copying the program from the backing store memory to the cache memory and executing the program to perform the at least one task by utilizing the program copied to cache memory.

20 Claims, 14 Drawing Sheets

Related U.S. Application Data

(60) Provisional application No. 61/522,576, filed on Aug. 11, 2011.

(51) Int. Cl.
*G06F 12/0893* (2016.01)
*G06F 12/0895* (2016.01)

(56) References Cited

U.S. PATENT DOCUMENTS

| | | | | |
|---|---|---|---|---|
| 2004/0098577 A1* | 5/2004 | Sane | ................... | G06F 9/30079 713/2 |
| 2006/0059316 A1* | 3/2006 | Asher | ................. | G06F 9/30014 711/141 |
| 2008/0140981 A1* | 6/2008 | Kim | .......................... | G06F 9/54 711/171 |
| 2011/0126209 A1* | 5/2011 | Housty | ................ | G06F 9/4405 711/170 |
| 2013/0311751 A1* | 11/2013 | Kurihara | ............... | G06F 9/3877 712/28 |

* cited by examiner

200

300

700

1000

1200

1300

1400

SYSTEM AND METHOD FOR SLICE PROCESSING COMPUTER-RELATED TASKS

CROSS-REFERENCE TO RELATED APPLICATIONS

The invention claims priority to and the benefit of U.S. Non-provisional application Ser. No. 13/572,164, now U.S. Pat. No. 9,092,348, filed Aug. 10, 2012 and entitled "SYSTEM AND METHOD FOR SLICE PROCESSING COMPUTER-RELATED TASKS", which claims priority to U.S. Provisional Patent Application No. 61/522,576, filed Aug. 11, 2011 and entitled "SYSTEM AND METHOD FOR SLICE PROCESSING COMPUTER-RELATED TASKS", the contents of both of which are herein incorporated by reference in their entireties.

FIELD OF THE INVENTION

The invention is related to the fields of computer memory, processing, and resource optimization, and more particularly, to computer-based systems and methods for utilizing cache memory capabilities for slice processing various tasks and operations.

BACKGROUND OF THE INVENTION

In the world of computing, there has been an ever-increasing emphasis on increasing the speed of computing, and, in particular, optimizing the processing of various tasks that computing devices handle. Most of today's central processing units (CPU) are designed to include at least one cache memory, of which there are assortments of types. Cache memory is often organized as a pipeline of instructions and data, where various schemes for optimal performance improvement select what is retained in the cache. Specifically, cache memory is typically faster, but smaller in capacity than backing store memory and resides between the CPU and the backing store memory. Cache memory is utilized to maintain a subset of data and instructions from backing store memory that has a high probability of being used by CPU. A CPU can access cache memory much faster than backing store memory, and therefore cache memory is very useful in increasing the overall speed of computing. While processing various tasks, it would be advantageous to fully process the tasks or portions of the tasks at cache memory speeds. In fact, processors often spend a prohibitive amount of time processing at backing store memory speeds or require control logic functions which would be time prohibitive, costly, and overly consumptive of memory space.

As a result, there is a need for more effective and efficient means for optimizing task processing by utilizing cache capabilities. Furthermore, there is a need for effective and efficient systems and methods creating a mode for processing tasks or portions of tasks at cache memory speeds.

SUMMARY OF THE INVENTION

The invention is directed to systems and methods for enabling a CPU to optimize the processing of various tasks and operations by causing at least one CPU of many to enter into a slice mode, wherein the slice mode utilizes a cache memory of each processor to decrease processing time spent on a particular task.

One embodiment of the invention is a computer-based system for optimizing task processing by utilizing cache capabilities. The system can include one or more processors configured to process and manage data. The system can also include one or more cache memories communicatively linked to the one or more processors. Additionally, the system can include one or more backing store memories communicatively linked to the one or more processors and to the one or more cache memories. Furthermore, the one or more processors can be configured to: enter a slice mode from a current mode and select a slice from the one or more backing store memories, wherein the slice comprises one or more programs residing in a memory space of the one or more backing store memories; retrieve the slice from the one or more backing store memories; store the slice in the one or more cache memories, wherein the slice can be stored in a sequential order; process one or more tasks utilizing the one or more programs contained in the slice by accessing the one or more cache memories; and terminate the slice mode and enter a different mode based upon receipt of an instruction.

Another embodiment of the invention is a computer-based method for task processing in a computing device. The method can include receiving an instruction to enter into a slice mode from a current mode. The method can also include entering the slice mode and selecting a slice from one or more backing store memories, wherein the slice comprises one or more programs residing in a memory space of the one or more backing store memories. Additionally, the method can include retrieving the slice from the one or more backing store memories. The method can further include storing the slice in one or more cache memories. The method can also include processing one or more tasks utilizing the one or more programs contained in the slice by accessing the one or more cache memories. Moreover, the method can also include terminating the slice mode and entering a different mode based upon receipt of another instruction.

Still another embodiment is defined when one or multiple processors are defined in a system, potentially within multiple single processor packages, it becomes possible to define systems where some, or all, processors can become dedicated to each individual thread of processing. It is conceivable that a very large collection of processing units, each with their own slice processing capability, can be defined within a reasonable space. One obvious use would be large server arrays, but if there are enough processors implemented in a single system, all of the threads of an operating system could be individually allocated, each to their own slice within a cache. The potential is that the Operating System, Utility, and Application(s) load may become distributed over an assembly of processors, each executing code at cache memory speeds. Performance improvements could be more than one order of magnitude.

In such an array, the cache system of each processor may then become tuned to the needs of each thread, where it is understood that many of the threads can be contained entirely within the cache memory of each processor itself. Some of the threads may be better served if they configure cache memory in traditional configurations for multi-processing and indeed, no two processors may require the same configuration within the system. One potential implementation might be STATICALLY define multiple processors with alternative cache configurations and allow the operating system to allocate threads to the best candidates. This approach might be sufficient where a system is routinely executing the same configuration of software.

In a system, where the software configuration changes spontaneously according the environment, it would be desirable to permit DYNAMIC RECONFIGURATION of the cache configurations under system control. Indeed, the system may try one configuration, then intervene, reconfigure and test the response to the intervention to select the optimal cache configuration for "Tuned" combinations of slice and traditional cache alternatives.

Extending the idea, where arrays of systems are coordinated, control of multiple systems, with the dynamically reconfigurable cache concept, could be controlled over a network.

Yet another embodiment of the invention is a computer-readable medium which contains computer-readable code that when loaded on a computer causes the computer to enter a slice mode from a current mode and selecting a slice from a backing store memory, wherein the slice comprises at least a portion of a program residing in a memory space of the backing store memory; to retrieve and copy the slice from the backing store memory to a cache memory, wherein the slice is copied to the cache memory in a sequential order; to process one or more tasks utilizing the portion of the program contained in the slice by accessing the cache memory; and to terminate the slice mode and enter a different mode based upon receipt of an instruction.

Indeed, the system may also be tuned, such that a set of processors are allocated, statically, or dynamically to perform such sequential cascade "slice" operations. As above, the system may heuristically tune itself by intervening, testing the response to intervention, reconfiguring on the fly, for the optimal multiprocessor cache system organization for any given set of operating system, utilities and applications.

In large networked systems, central control may be defined, where multiple systems, each potentially with multiple n-way processors, may have their cache configurations remotely managed for performance and other functional optimizations. E.g. some processors in an array may be dynamically configured to create graphic images. Indeed these processors may not have the same instruction sets as others, but dynamic configuration of their cache configuration would allow them to adjust to the size or resolution of images for example. One could envision a graphic processor, potentially subordinate to others in the same system (or networked) with one processor per a set of picture elements. The size of the set could change with the size of cache space dedicated to the set.

Net: portions of a task like IE, for encryption-decryption (e.g. within secure socket operations), and message compression-decompression might be dedicated "slice" processes. Indeed graphic operations from expanding HTML to painting complex screens might be accomplished this way. There might be a variation of the concept specific to implementing graphic display processors—which today use an array specialized cpus, with individual or shared caches and typically a common backing store for the display processor alone.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
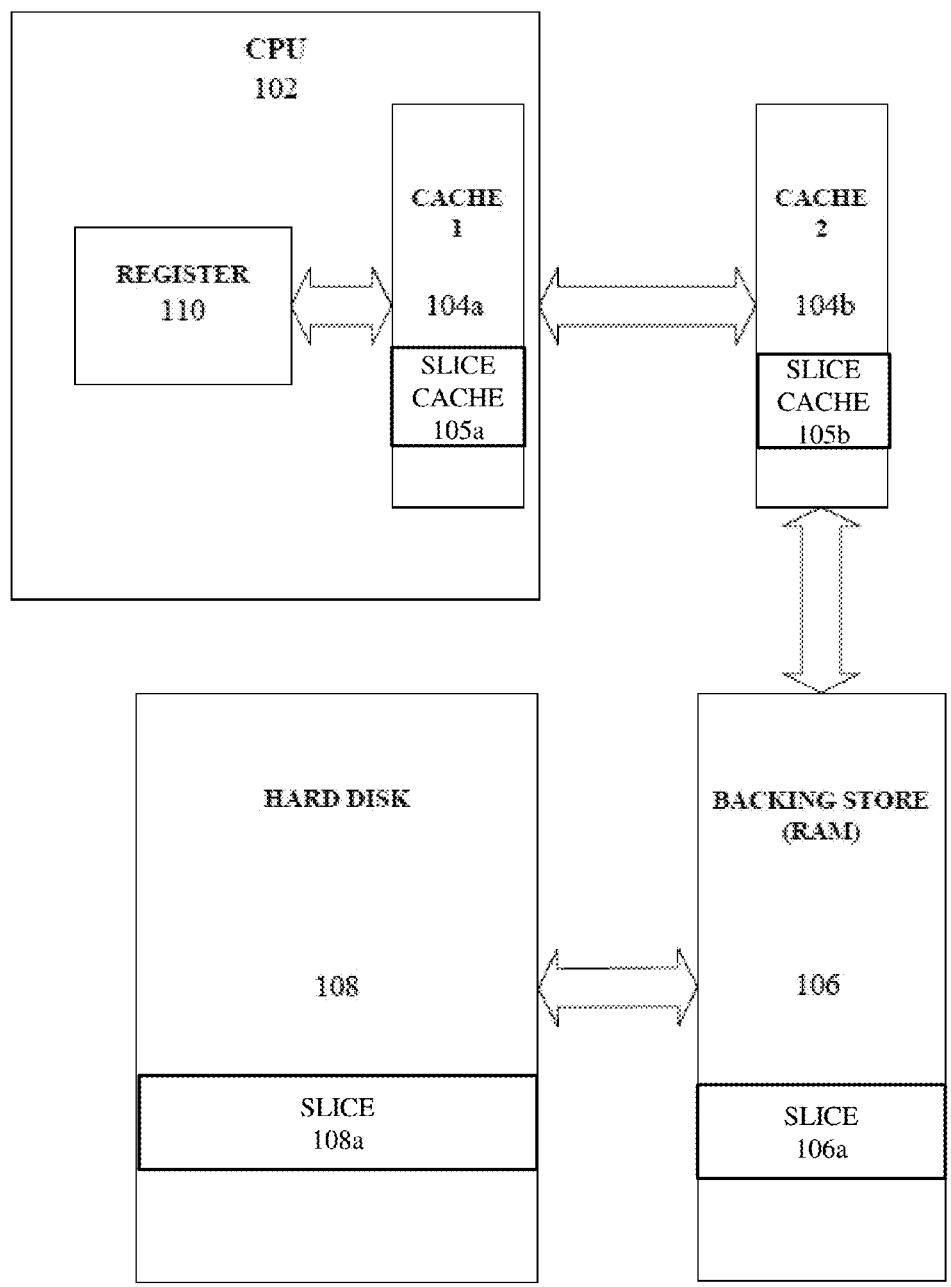
FIG. 1 is a schematic view of a system for optimizing task processing by utilizing cache capabilities, according to one embodiment of the invention.

Referring initially to FIG. 1, a system 100 for optimizing task processing by utilizing cache capabilities, according to one embodiment of the invention, is schematically illustrated. The system can include one or more processors 102 configured to manage and process data. The system 100 can also include one or more cache memories 104*a-b* communicatively linked to the one or more processors 102. Additionally, the system 100 can include one or more backing store memories 106 communicatively linked to the one or more processors 102 and the one or more cache memories 104*a-b*. The backing store memory 106 can comprise, but is not limited to, one or more of a random-access memory (RAM), a hard disk, a magnetic disk, an optical disk, a cache memory, a flash memory, and other memories. Furthermore, the system 100 can include a hard disk 108 and a register 110. Even though one processor 102, two cache memories 104*a-b*, one backing store memory 106, one hard disk 108 and one register 110 are shown, it will be apparent to one of ordinary skill based on the description that a greater number of processors, backing store memories, hard disks, and registers can be used and that a greater or lesser number of cache memories can be used according to the invention.

Notably, the one or more processors 102 can be implemented in hardwired, dedicated circuitry for performing the operative functions described herein. In another embodiment, the one or more processors 102 can be implemented in computer-readable code configured to execute on a particular computing machine. In yet another embodiment, however, the one or more processors 102 can be implemented in a combination of hardwired circuitry and computer-readable code.

Operatively, when the processor 102 encounters a particular task for processing, it can be configured to enter into a slice mode from a current mode. The slice mode can be triggered upon the receipt of a computer instruction, a signal such as an interrupt, and the like. In an embodiment featuring multiple processors, some of the processors can enter slice mode while others can stay in their current mode. For example, if there are five processors, then two can enter slice mode while the remaining three can stay in their current modes. The processor 102 can also select a slice 106a from the backing store memory 106, wherein the slice 106a can comprise one or more programs residing in a memory space of the backing store memory 106. Also, a slice can be selected from the hard disk 108 or other memory/storage components if necessary, as from slice 108a. Notably, the determination of which slice is to be selected can be based on the received instruction, another instruction, or signal. Of course, more than one slice can be selected and the slices can be selected from multiple backing store memories or even lower level cache memories. Typically, the slice 106a will be smaller in size relative to the backing store memory 106. The slice 106a can be utilized for a variety of operations/tasks including, but not limited to, data compression/decompression, encryption/decryption, video processor functions, or other CPU intensive operations which would benefit from processing at cache memory speeds.

Once the slice 106a is selected from the backing store memory 106, the processor 102 can retrieve from the slice 106a the backing store memory 106 and store the slice 106A in cache memory 104a at slice cache 105a, cache memory 104b at slice cache 105b, or both cache memories 104a and 104b. Notably, the slice 106a can be stored in a sequential order in the cache memories 104a and 104b. The processor 102 can then proceed to process a task utilizing the one or more programs contained in the slice 106a by accessing either or both of the cache memories 104a and 104b at corresponding ones of slice caches 105a and 105b. Also, the processing can begin at the virtual zero address of the memory space. When the task has been completed, the processor 102 can terminate the slice mode and enter into a different mode based upon the receipt of an instruction to do so. Notably, the current modes and different modes can comprise a normal mode, a real mode, a virtualization mode, a protected mode, and the slice mode.

Real mode can, for example, be a mode in which applications can have direct access to physical memory, such as backing store memory. Protected mode can be a mode which allows system software to utilize features such as virtual memory and paging to increase control over various applications. Normal mode can be a mode existing under normal operation and processing conditions, a mode returned to after exiting another mode, or a mode that existed prior to entering slice mode. It is important to note that real mode, virtualization mode, normal mode and protected mode can also encompass other definitions understood by one of ordinary skill in the art.

According to a particular embodiment, the processor 102 can be configured to return the slice (i.e., the contents of slice caches 105a and 105b) to the backing store memory 106 upon termination of the slice mode. The processor 102 can also be configured to transfer a cache state and/or contents from cache memory 104a, cache memory 104b, or both cache memories 104a and 104b to the register 110 of the processor 102 during the slice mode. Of course, more than one register can be utilized to retain cache states during a slice mode. In another embodiment, the processor 102 can be configured to transfer a current cache state from cache memory 104a, cache memory 104b or both cache memories 104a and 104b to the backing store memory 106 prior to entering into the slice mode. Upon termination of the slice mode, the processor 102 can be configured to transfer the transferred current cache state from the backing store memory 106 back to the cache memories 104a and 104b. This can allow the cache memories 104a and 104b to revert to their pre-slice mode state and/or receive back their original cache contents.

In yet another embodiment, the one or more programs can comprise one or more canned routines stored in the backing store memory 106. The processor 102 can further mark the one or more canned routines as uncacheable. The marked routines can be utilized when slice mode is entered by the processor 102. According to another embodiment, the processor 102 can be configured to load and copy the one or more canned routines to slice (i.e., into slice caches 105a and/or 105) after entering into the slice mode. The one or more canned routines in the slice can be utilized by the processor 102 to rapidly process various tasks. In another embodiment, the one or more cache memories 106 can be organized as a real mode space beginning at real address zero.

An example of slice mode in operation using routines can be seen in the context of image construction. Assume an image is to be constructed in a bit-mapped space within a simple display controller. The image can include textures, ray-tracing and other image functions, which typically require a graphics engine or a prohibitive amount of processing at backing store speeds. As the image is being constructed, portions of the overall process can be handed over to routines, which were loaded to the slice created from the cache memory. Once the routines end, the results are mapped to the image. Although a graphics processor could possibly provide more rapid function for the situation above, the slice mode is very useful in providing a solution that does not require a significant amount of expensive hardware to be utilized.

Another example of slice mode in operation can be in the context of sending encrypted messages over a connectivity link to a computer device or system. When receiving such messages, the processor 102 would normally spend a significant amount of processing time in the word processing and the viewing of the composed text. Despite this, performing the encryption and decryption on the receiving end would increase the latency for transmission considerably. This increase in latency can be avoided by utilizing cache capabilities for slice processing at least the encryption portion of the task.

Figure 2:
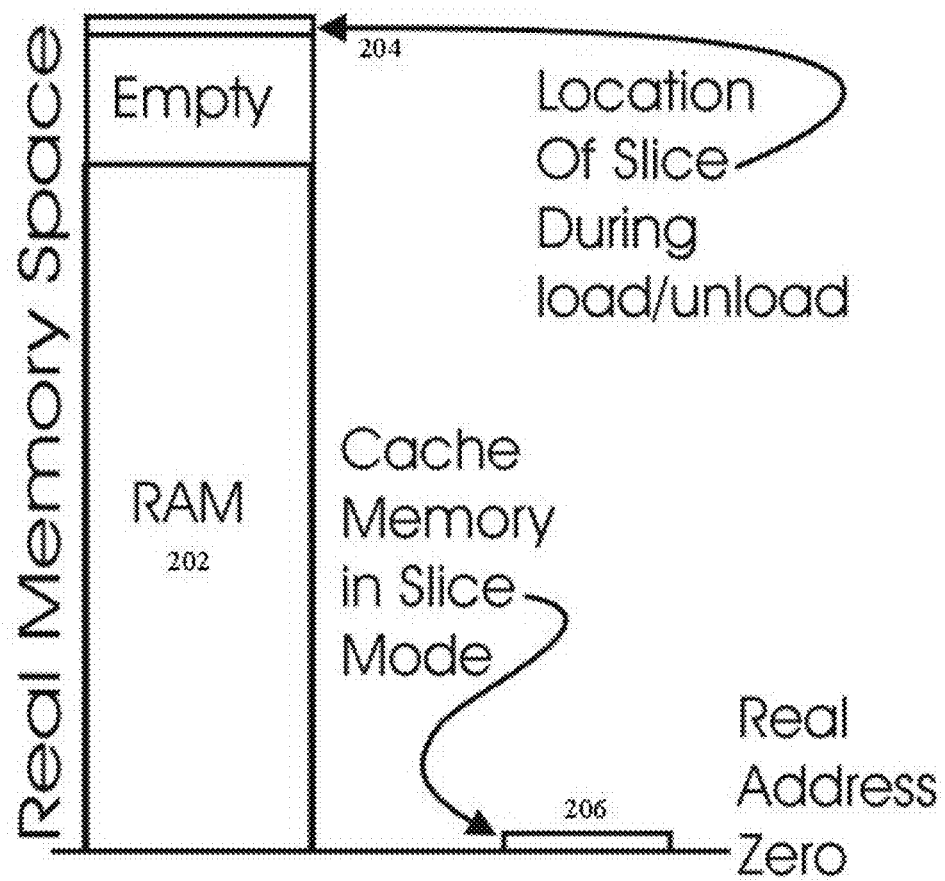
FIG. 2 is a schematic view illustrating slice mode in a system according to the invention.

Referring now also to FIG. 2, a schematic view illustrating slice mode in a system 200 according to the invention is depicted. The system 200 can include a backing store (RAM) 202, which can contain a used portion and an empty portion. Prior to the invocation of slice mode, one or more programs can be contained in a slice in location 204 of the backing store 202. Once slice mode is triggered and entered, the one or more programs contained in the slice can be loaded to cache memory 206, which can be addressed beginning at real address zero. When slice mode is terminated, the one or more programs can be transferred back to the backing store (RAM) 202.

Figure 3:
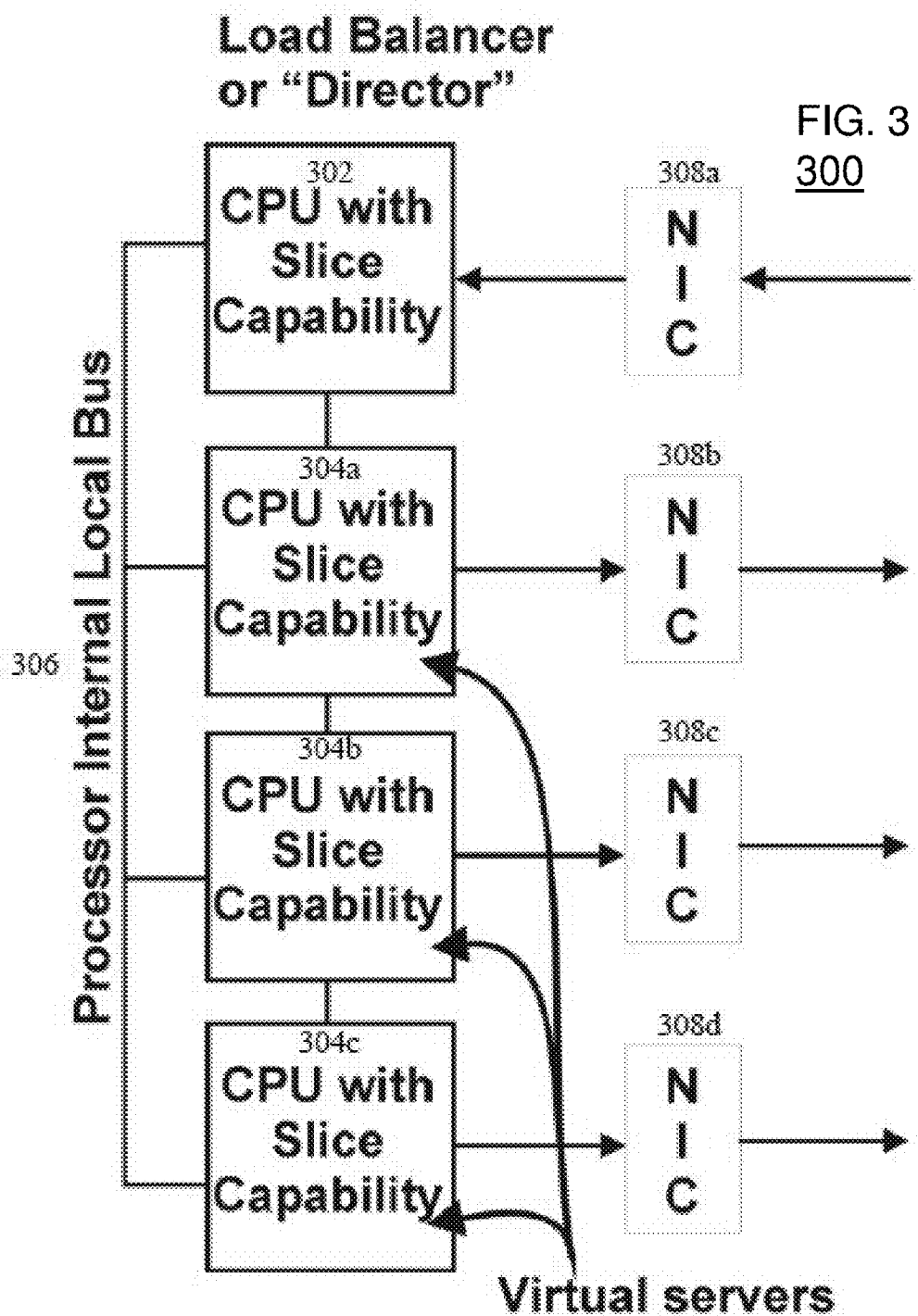
FIG. 3 is an illustration depicting the operation of slice mode in a system featuring a load balancer and virtual servers.

Referring now to FIG. 3 an illustration depicting the operation of slice mode in a system 300 is schematically illustrated. The system 300 can include a load balancer/director 302, which is a CPU with slice capability that can receive various types of requests, including web requests. Additionally, the system can include a set of virtual servers 304a, 304b, and 304c, also with slice capability, which are communicatively linked with the load balancer/director 302 using a processor internal local bus 306. The system can also include network interface cards (NIC) 308a, 308b, 308c, and 308d, corresponding to each of CPU's 302, 304a, 304b, and 304c, respectively. The load balancer/director 302 can, for instance, receive a request for a web page via NIC 308a and maintain a list of which virtual servers 304a-304c are busy. Next, the load balancer/director 302 can then direct return of the web page to an idle one of the virtual servers 304a-304c. The virtual servers 304a-304c can then mimic the IP address of the inbound port of the load balancer/director 302. These functions can fit within the slice space so that all the CPUs are operating at full speed.

Figure 4A:
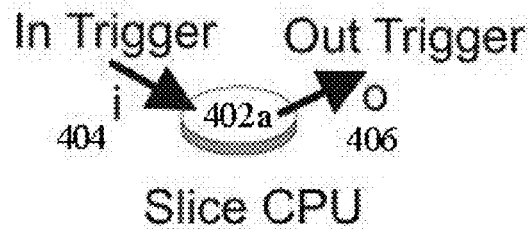
FIGS. 4A, 4B, 4C, and 4D depict various scenarios for triggering slice mode in a system according to the invention.
Figure 4B:
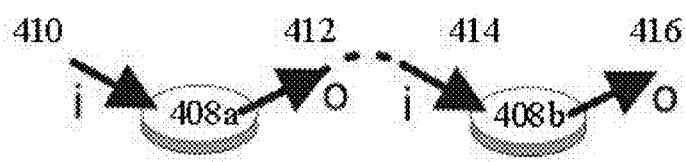

Referring now to FIGS. 4A, 4B, 4C, and 4D, there are depicted various exemplary scenarios for triggering slice mode in a system. The scenario in FIG. 4A features a slice processor 402a with an "in" trigger (i) 404 and an "out" trigger (o) 406. As mentioned above, the "in" trigger 404 can be based on a received instruction, signal or other outside event and can trigger the slice processor 402a into slice mode. The "out" trigger 406, however, can be utilized to trigger other processors into slice mode or other modes. Such a scenario is shown in FIG. 4B, which features two slice processors 408a-b. "In" trigger 410 activates slice mode for processor 408a, which then can lead to the transmittal of "out" trigger 412. "Out" trigger 412 can serve as or stimulate the "in" trigger 414 for slice processor 408b. "In" trigger 414 can cause processor 408b to enter into slice mode or another mode. Processor 408b can also send out an "out" trigger 416. Such a use of "in" triggers and "out" triggers can allow for the cascade triggering for as many processors as desired.

Figure 4C:
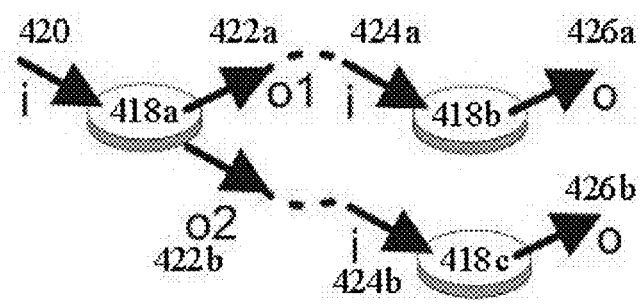

The scenario in FIG. 4C provides for a situation in which there can be multiple conditional "out" triggers. For example, the scenario in FIG. 4C can include three slice processors 418a-c. "In" trigger 420 can activate slice processor 418a into slice mode or another mode. Processor 418a can transmit multiple "out" triggers such as "out" triggers 422a and 422b, which can serve as or stimulate "in" triggers 424a and 424b for processors 418b and 418c respectively. "In" triggers 424a and 424b can cause processors 418b and 418c to enter into slice mode or another mode. It is important to note that processors 418b and 418c do not have to be triggered into the same mode or even triggered into processing the same task. These processors, in turn, can send out their own "out" triggers 426a-b and the process can keep going. Notably, the "out" triggers can be the result of a condition in the processing path in a particular processor.

Figure 4D:
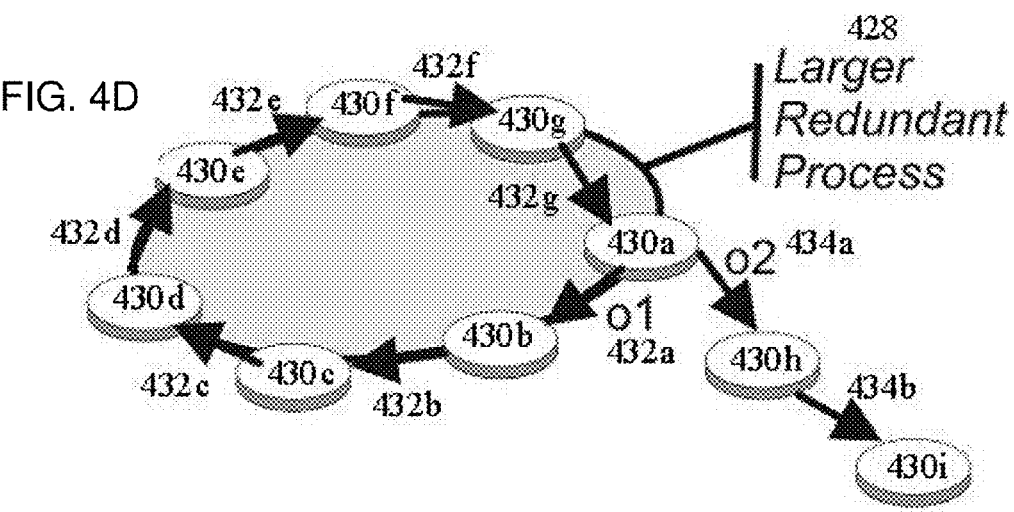

The scenario in FIG. 4D provides a situation where multiple processors can be part of a larger redundant process 428. Much like the above scenarios, the slice processors 430a-i can be triggered into slice mode or other modes through the receipt of instructions, signals, and the like. Triggers 432a-g can be used to trigger the processors 430a-g to slice process a particular task or operation and triggers 434a-b can be used to trigger processors 430h-i for a different task or operation. The different tasks and operations being processed by the different sets of processors can all be part of the larger redundant process 428.

An example of where such scenarios can be utilized can be in the context of using multiple processors to reduce a matrix. If, for example, the components of the matrix had to be decoded in sequence, such as in the case of decompressing video, each processor can trigger the next processor in line by connecting the out trigger of the preceding processor to the in trigger of the next processor in line. When the end of a video frame is reached, the first processor can be triggered by the last processor, which can result in the first processor performing the decoding of associated audio. Since the last processor working on video can trigger the first processor into working on audio, this can synchronize audio and video on the start of each frame. This process can keep continuing until a signal or instruction is received to process something else or stop.

Furthermore, slice processing can occur as an overlaying process, such as where groups of processors have their own normal modes. The groups of processors can all reside on a single chip or on different chips. One group of processors can be set to print out documents, another set can handing the communication of email to a network, another set can perform an Internet search, and another set can be used for processing and playing a video game. When a signal for slice mode arrives, all of the processors in the above groups can be triggered into performing a particular task and then return to their normal duties upon completion of the task.

Figure 5:
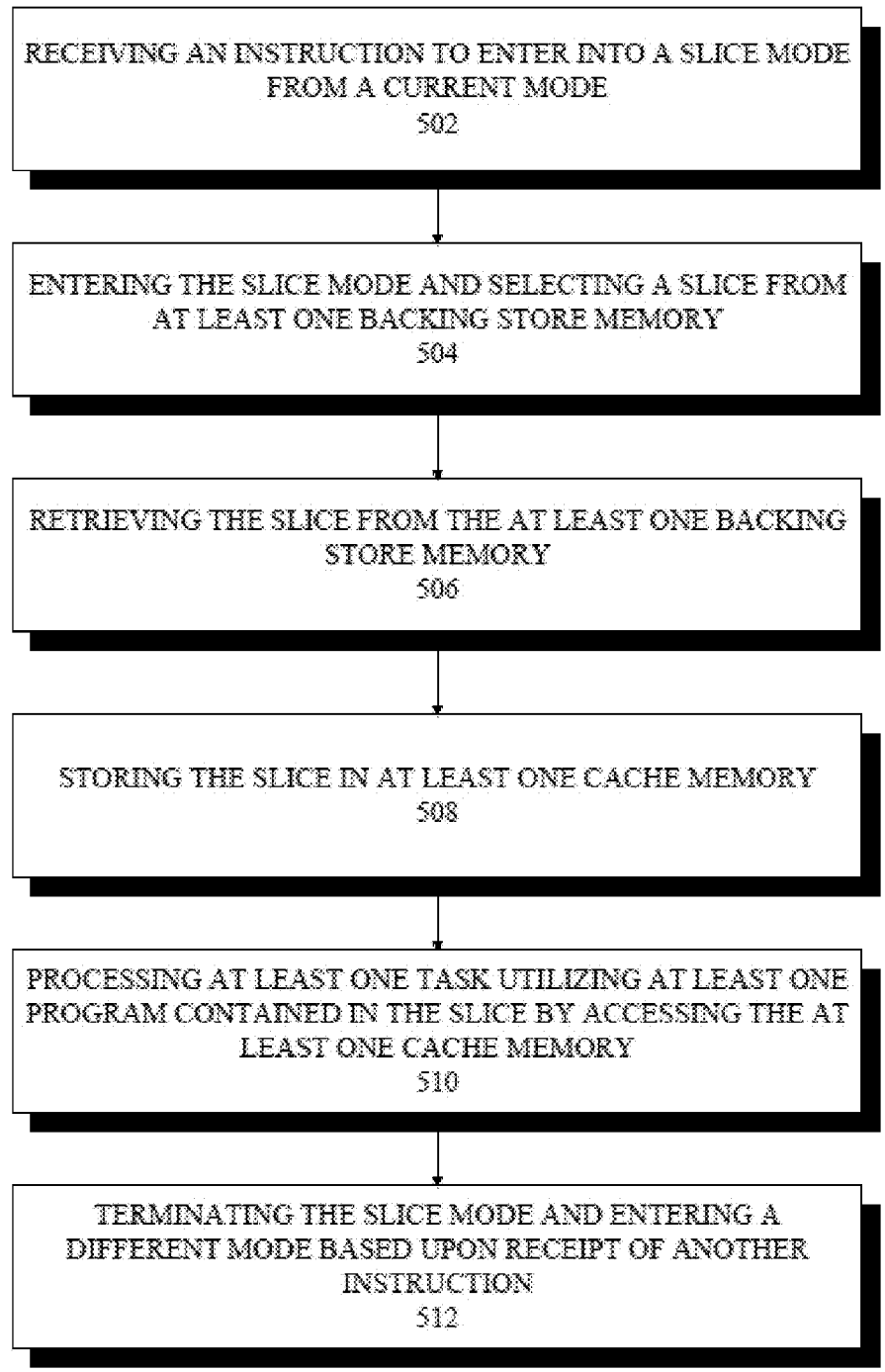
FIG. 5 is a flowchart of steps in a method for task processing in a computing device, according to another embodiment of the invention.

Referring now to FIG. 5, a flowchart is provided that illustrates certain method aspects of the invention. The flowchart depicts steps of a method 500 for task processing in a computing device containing a processor. The method 500 illustratively can include, beginning at step 502, receiving an instruction or signal at the processor to enter into a slice mode from a current mode. The method 500 also can include entering the slice mode and selecting a slice from one or more backing store memories, wherein the slice can comprise one or more programs residing in a memory space of the one or more backing store memories at step 504. The determination of which slice is to be selected can be dictated by the received instruction or signal or other instructions. Also, it is important to note that the slice can contain portions of programs, computer instructions, and the like. The backing store memories can comprise one or more of a random-access memory, a hard disk, a magnetic disk, an optical disk, a cache memory, a flash memory, and other memories.

Additionally, the method 500 can include at step 506 retrieving the slice from the one or more backing store memories. The method 500 also can include storing the slice in one or more cache memories at step 508. Notably, the slice can be stored in the cache memories in a sequential order. The method 500 further can include at step 510 processing one or more tasks utilizing the one or more programs contained in the slice by accessing the one or more cache memories. Moreover, the method 500 can include terminating the slice mode and entering a different mode based upon receipt of another instruction at the concluding step 512. The current mode and the different mode can comprise include, for example, a normal mode, a real mode, a virtualization mode, and a protected mode.

In a particular embodiment, the method 500 can further comprise returning the slice to the one or more backing store memories upon termination of the slice mode. The method 500 can also include transferring a cache state and/or contents from the one or more cache memories to one or more registers of the computing device during slice mode. According to another embodiment, the method 500 can further include transferring a current cache state and/or cache contents from the one or more cache memories to the one or more backing store memories prior to entering into the slice mode. When slice mode is terminated, the method 500 can further include transferring the transferred current cache state and/or cache contents from the one or more backing store memories back to the one or more cache memories.

According to yet another embodiment, the one or more programs can comprise one or more canned routines stored in the backing store memory and further comprise marking the one or more canned routines as un-cacheable. The method 500 can also include loading and copying the one or more canned routines to the one or more cache memories after entering into the slice mode. These canned routines can be utilized by the processor to aid in the processing of various tasks and operations. In another embodiment, the method 500 can further include organizing the cache memory as a real mode space beginning at real address zero.

Figure 6A:
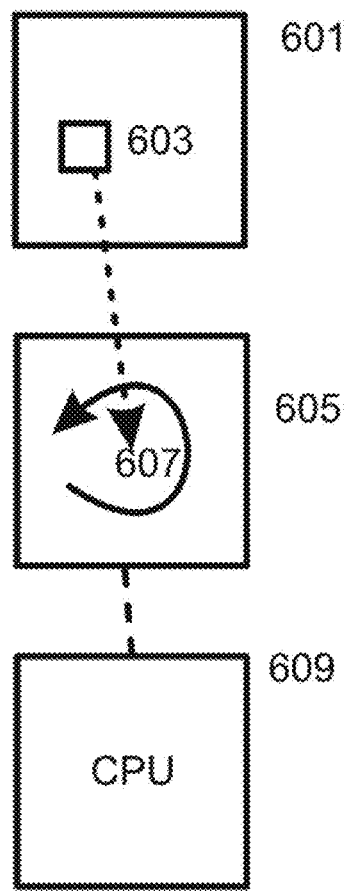
FIGS. 6A and 6B are a comparison of slice and traditional cache configuration.
Figure 6B:
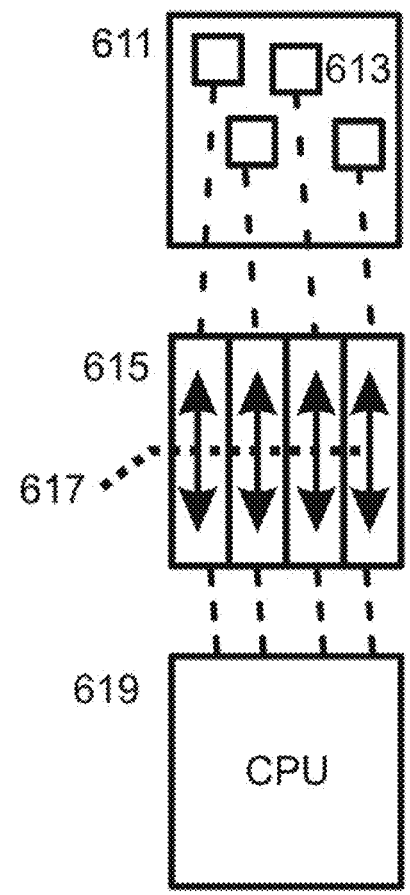

FIGS. 6A and 6B show a comparison of a sliced cache configuration according to the various embodiments (FIG. 6A) and a traditional cache configuration (FIG. 6B). In the sliced cache configuration of FIG. 6A, a segment of code in the backing store 601 is transferred to the cache slice 605 for dedicated processing 607. The CPU 609 may concentrate on this process indefinitely. In a traditional approach, as shown in FIG. 6B, the backing store 611 may have many segments of code 613 moving in and out of the cache 617, which is segmented 617 for multiple concurrent operations in CPU 619. Applying these two methodology, one can construct a multi-core system configured to operate with both methodologies. This is illustrated in FIG. 7.

Figure 7:
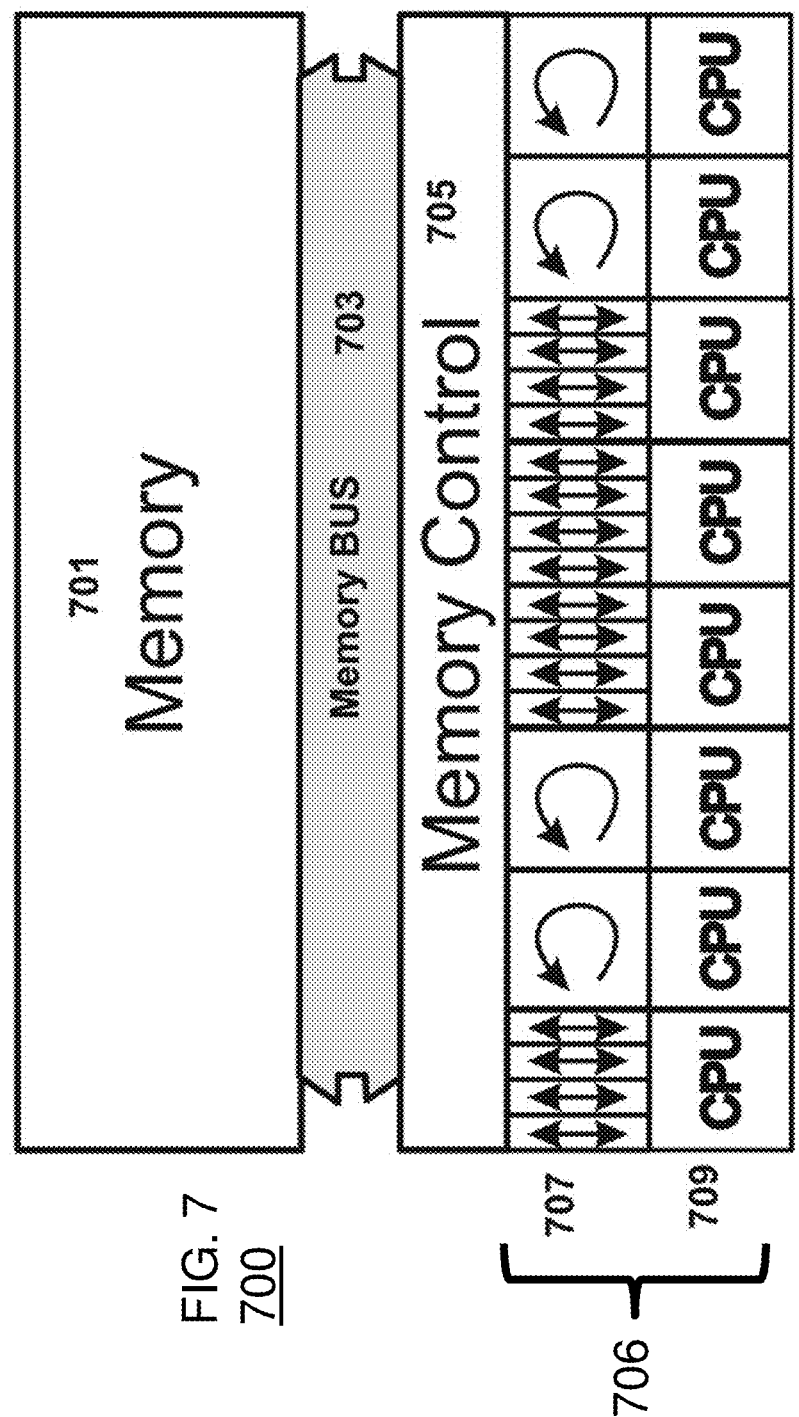
FIG. 7 is the organization of a multi-core processing chip with mixed modes.

FIG. 7 shows a system 700 with an 8-way multi-core configuration in accordance with the various embodiments. System 700 includes a backing store or memory 701, a memory bus 703, memory logic controls 703, and multicore processor 706. As shown in FIG. 7, multicore processor 706 includes eight CPUs (709) and eight corresponding cache memories (707).

In operation, the memory 701, memory bus 703, and memory control 705 are shown as being common or aggregated for all CPUs 706 of multicore processor 706. However, the various embodiments are not limited in this regard. For example, the memory 701 could remain segregated between CPUs 709. In operation, some of the cache configurations are traditional and others are slice dedicated, as described above with respect to FIGS. 6A and 6B. The advantages of this configuration are discussed below.

Figure 8:
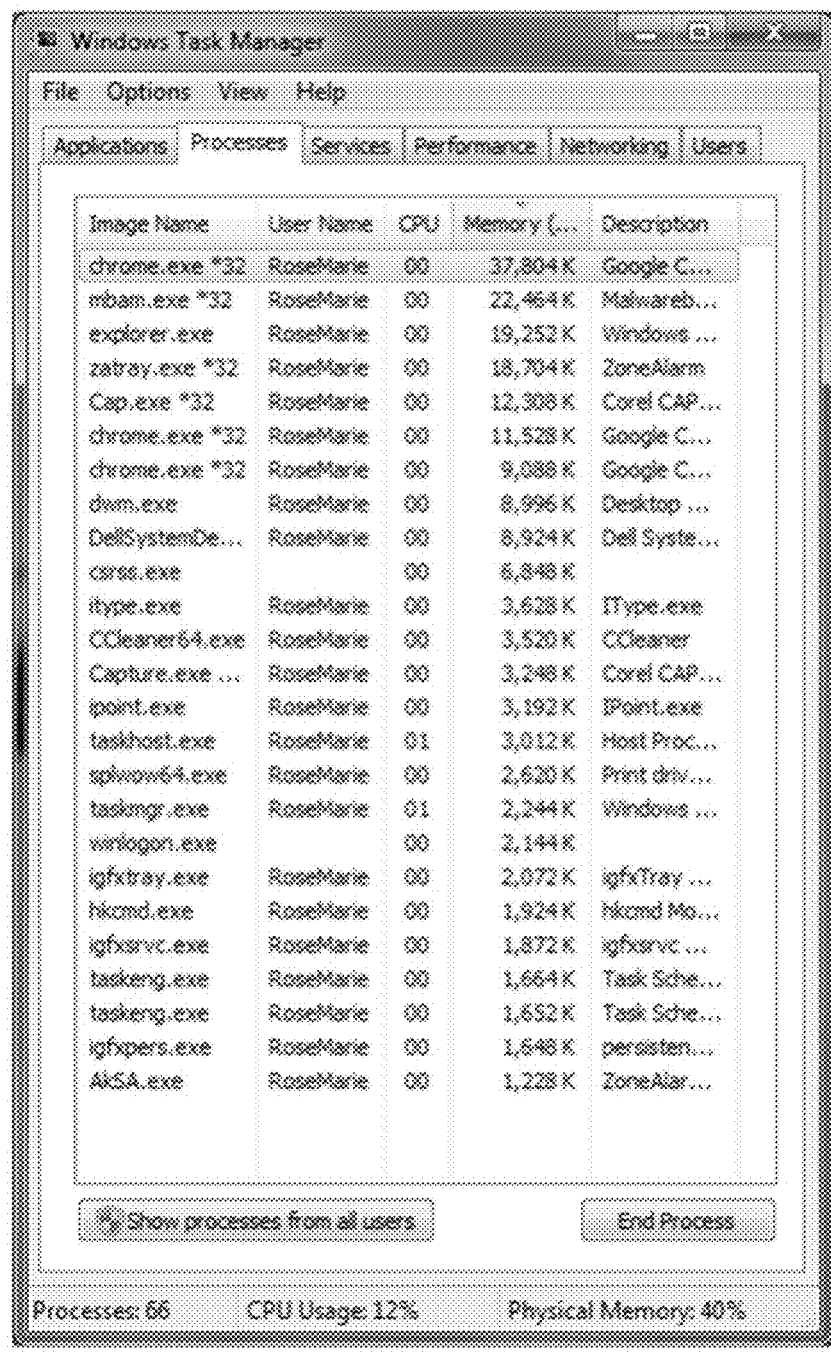
FIG. 8 shows an exemplary user interface presenting a list of typical processes running on a computer.

FIG. 8 shows a snapshot of a user interface 801 displaying a list of processes being performed on a computer operating using a WINDOWS operating system from Microsoft Corporation of Redmond, Wash. As shown in FIG. 8, there are 25 tasks, including utilities for anti-virus and systems management. In theory, under a more elaborate OS than current, some or all of these processes could have their own processor. In an environment where processes compete for execution within a processor now, having dedicated capability could only improve performance. In order to take this snapshot, the system was quiescent; however, typically the system will see much more activity and competition, to the point where 100% of the CPU, shown in the $3^{rd}$ column may be utilized.

Figure 9:
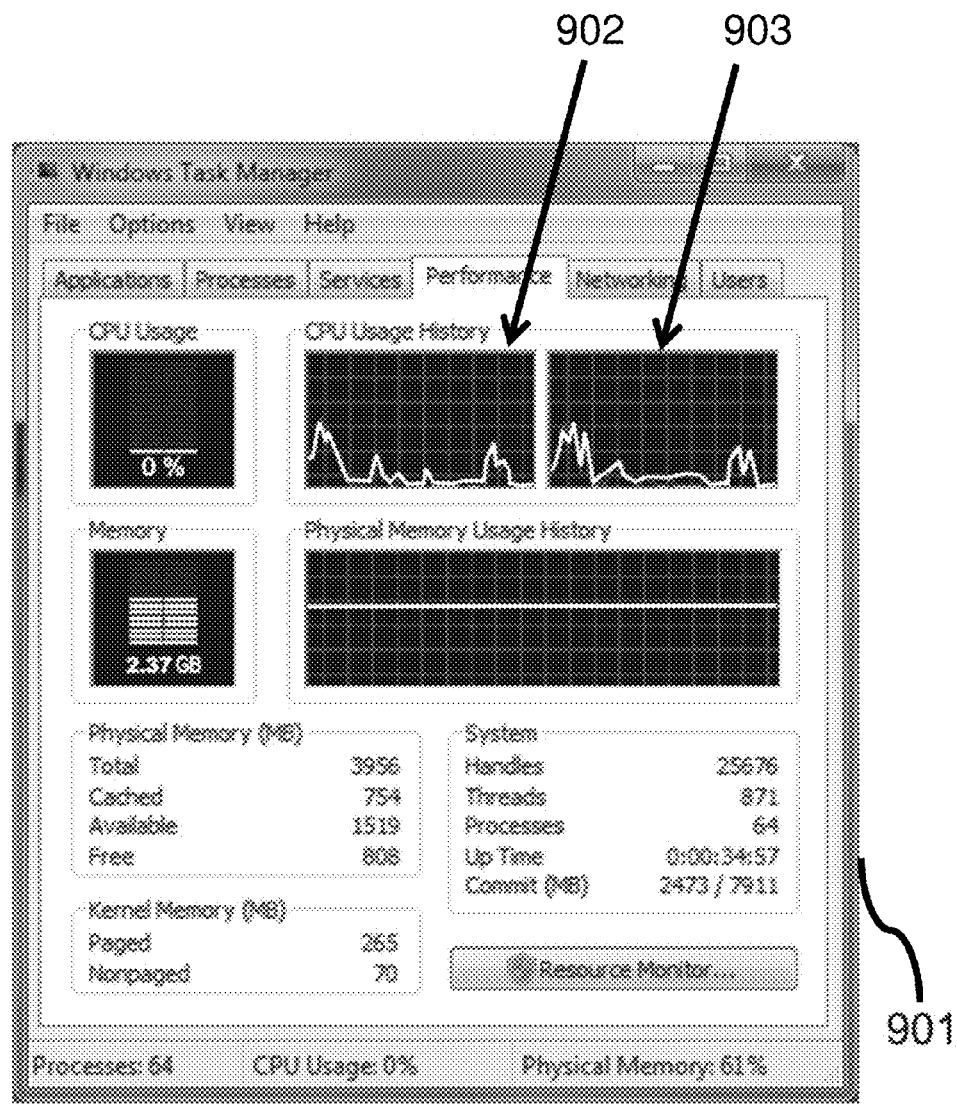
FIG. 9 Shows an exemplary user interface showing usage date for multiple cores.

FIG. 9 shows a snapshot of user interface displaying resources being used on a computer operating using a WINDOWS operating system from Microsoft Corporation of Redmond, Wash. As shown in FIG. 9, activity for two active cores (902 and 903) is displayed under "CPU Usage History." These show instantaneous CPU utilization along with history. The processor is show to have divided the tasks between the two cores, where a maximum of 50% of capacity had been used. When 100% of a core is used, the OS would typically performs a triage by delaying lower priority tasks in favor of other tasks. If there are a large number of cores, this will happen only when the system in more heavily loaded. However, if some processes have their own dedicated slice processor core, then that process cannot interfere with other tasks competing for attention on the remaining processor cores.

While the present disclosure contemplates that the slice processing configuration techniques of the invention can be applied to existing multicore processors with identical cores, the various embodiments are not limited in this regard. The present disclosure also contemplates that a multicore processor may be configured to have non-identical cores. That is, cores can vary in capacity, cache size, clock rate, and/or cache memory speed, to name a few. Thus, a processor with both high performance cores and low performance cores can take advantage of the various embodiments. For example, in such a processor, low performance cores can be provided and can be used for dedication to essential, but small processes that could theoretically be dedicated within the cache. This is illustrated in FIG. 10.

Figure 10:
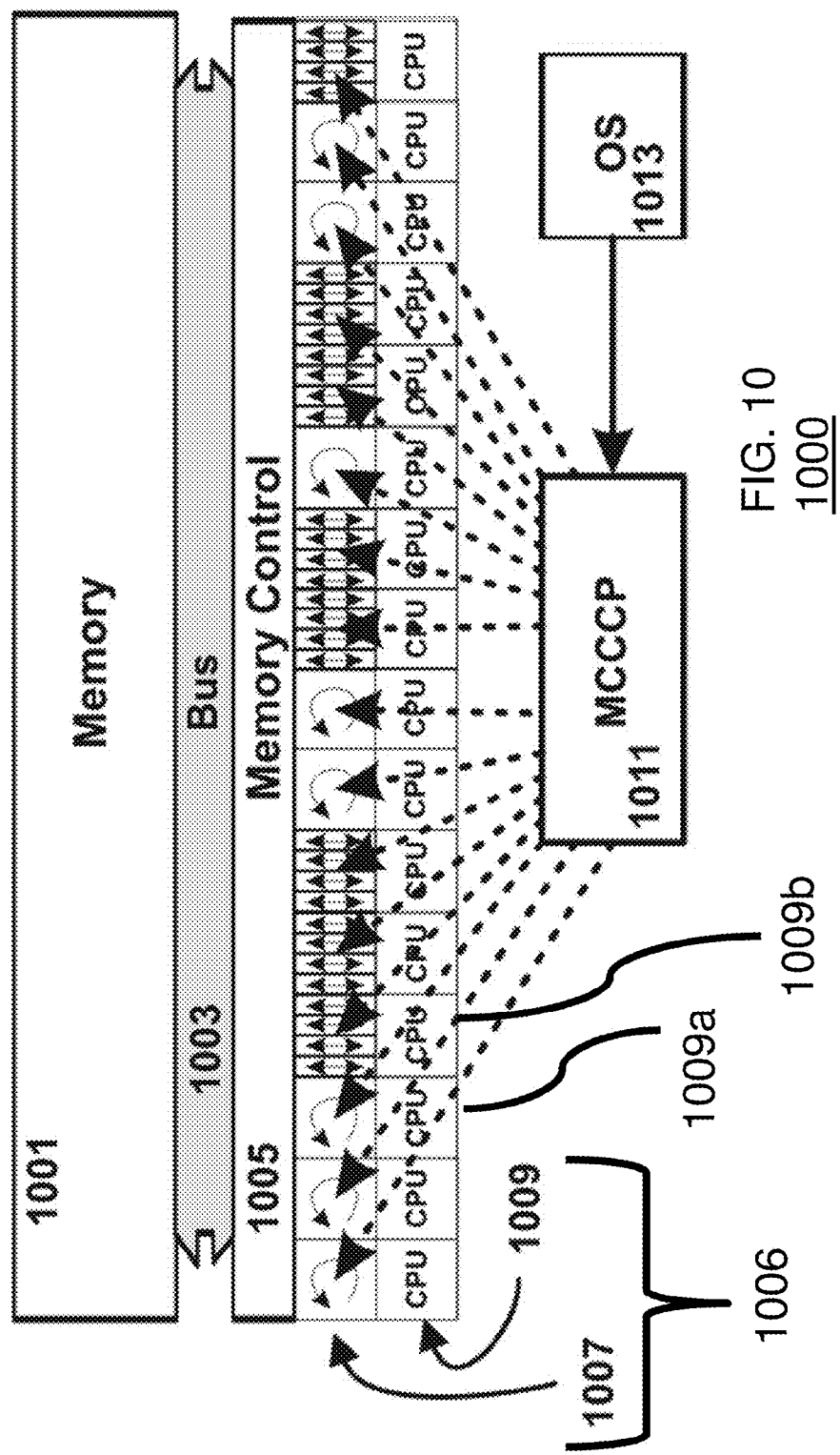
FIG. 10 shows the addition of a multi-core cache configuration processor under control of the operating system.

FIG. 10 shows a system 1000 with core diversity and configured according to an embodiment of the invention. As shown in FIG. 10, system 1000 has a processor 1006 with 16 CPUs 1009, each with a corresponding one of cache memory systems 1007. System 1000 also includes common memory control logic 1005, a memory bus 1003, and a common backing store or memory 1001 for processor 1006. As discussed above, the memory 1001 or other components can be aggregated or segregated for CPUs 1009. As shown in FIG. 10, some of the CPUs 1009 can be configured to operate with a slice configuration (e.g., 1009a) and others can be configured to operation according to a traditional configuration (e.g., 1009b), as discussed above with respect to FIGS. 6A and 6B, respectively. In some embodiments, the configuration of some or all of the CPUs 1009 can be dynamic, such that a slice mode could be invoked in any one of CPUs 1009 as required. In the case where there is diversity among CPUs 1009, the invocation of a slice mode for a one of cache memories 1007 for a particular one of CPUs 1009 can be made depending on the capabilities of the one of CPUs 1009 and the one of the cache memories 1007.

In some embodiments, the configuration of each of cache memories 1007 can be controlled by a master cache control configuration processor MCCCP 1011. This component can be directly or bus connected to each of the cache memories 1007. In some cases, the MCCCP 1011 can set the cache memories 1007 with a static or default configuration, where the operating system 1013 allocates processes to specific ones of CPUs 1009 of appropriate performance and appropriate cache configuration, size and performance. Alternatively, the MCCCP 1011 control the processor 1006 dynamically. That is, the MCCCP 1011 can juggle tasks between CPUs 1009 or change the configuration, size, speed and capacity each of CPUs 1009 as required by the process currently executing within it. In the dynamic mode, the MCCCP 1011 can be dynamically under control of one or more operating systems being executed by processor 1006. For example, in some configurations, different ones of CPUs 1009 can therefore have different operating systems. Alternatively, different ones of CPUs 1009 can have distributed responsibilities under a common operating System 1013, as shown in FIG. 10.

Moreover, the system 1000 can be configured to manage processes so as ensure completion of time sensitive tasks within specific time periods. For example, for a time sensitive task or operation (e.g., a communications task requiring maintaining at least some synchronization), the operating system 1013 can be configured to estimate an amount of resources needed to complete the task or operation within a prescribed time. This information can then be provided to the MCCCP 1011, which can then determine the appropriate use of the cores for the various processes associated with the task or operation to ensure completion of the task or operation on time or within the prescribed time limit.

One example for using such a configuration is for media compression or decompression, such as video. In the case of video compression or decompression, some video compression schemes rely on the use of macroblocks, square-shaped groups of neighboring pixels. In operation, the macroblocks are compared from one frame to the next and only the differences within those blocks are encoded. Thus, in areas of video with more motion, more data is encoded to keep up with the larger number of pixels that are changing. As a result, since the number of changes needed to encode and decode data can vary significantly from frame to frame, this can result in a significant change in the resources needed to process each frame. Thus, to more efficiently manage the operation, the cores can be configured so that an appropriate amount of resources are provided for processing each frame. This can, in some cases, involve predicting an amount of resources needed based on the changes observed the encoded video.

A similar scenario is the case of communications overrun, where incoming data can be of unknown length and speed. In such cases, a configuration can be used that can handle a worst case overrun initially. Thereafter, as the length and speed of the incoming data is better understood, a configuration utilizing less resources can be utilized.

In dynamic operation, the MCCCP 1011 could implement a cache in one configuration, test it, and respond to the test with another proposed configuration to address the results of the test by adjusting at least one of cache configuration, size, performance, or any other parameter of the cache memories 1007 or their corresponding CPUs 1009. Thus, the OS 1011 could "cut and try" or more specifically intervene in an operation, by testing and responding to the intervention with an improved configuration.

To provide such functionality, operating system 1013 or other program to be executed using a processor in accordance with the various embodiments can be compiled using a compiler that breaks a process to be performed up into many parallel operations, including slice configuration operations and/or traditional configuration operations. In certain embodiments, the compiler can be configured to recognize and tag such code segments that might be eligible for execution on slice processors and commands would be embedded to assign the dedicated processing to available or configured slice processors. This compilation process is illustrated in FIG. 11.

Figure 11:
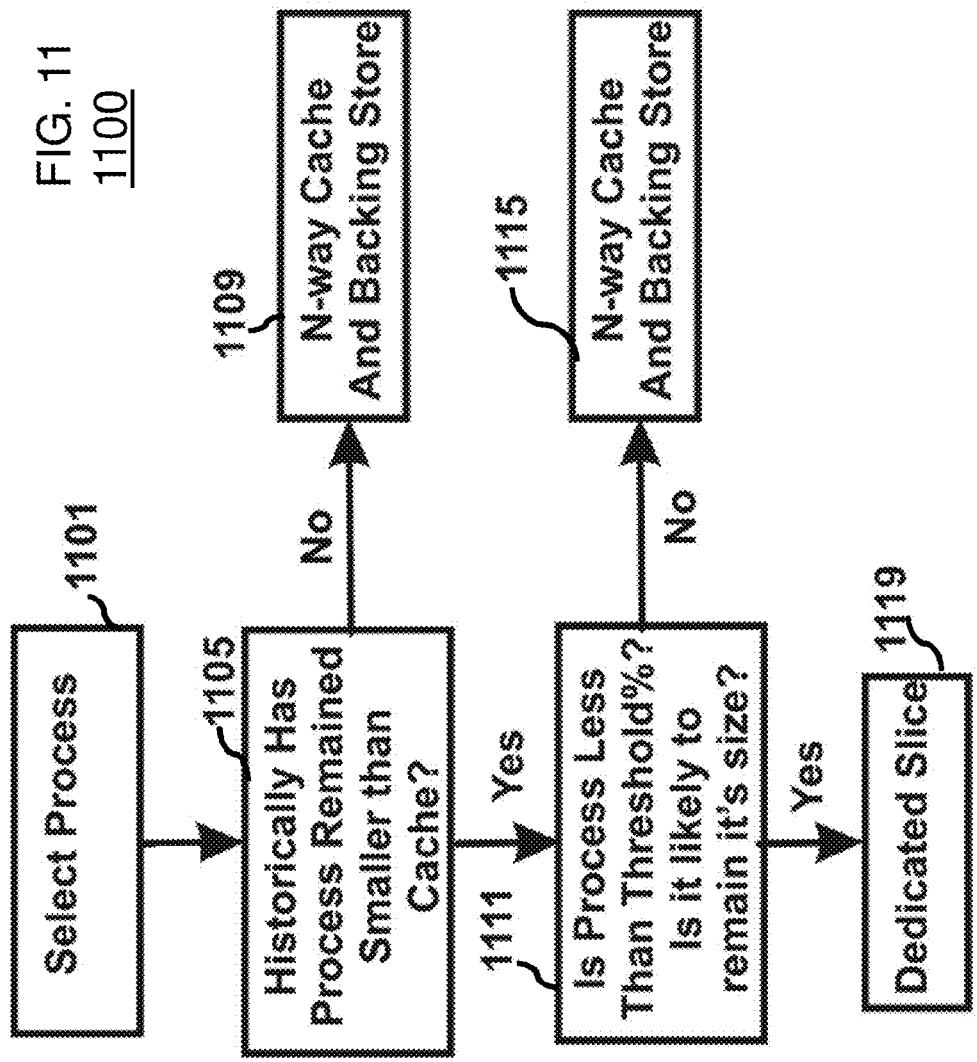
FIG. 11 shows an example cache control configuration algorithm.

FIG. 11 shows an flowchart of steps in an exemplary method 1100 for the selection between slice and traditional cache mode for a program process at a complier configured in accordance with an embodiment of the invention. At step 1101 a process 1101 is selected. Thereafter, at step 1105, the process is tested to see if it will likely remain small enough to fit within the cache entirely. If the answer is no at step 1105, the cache is set to traditional mode at step 1109. If the answer is yes at step 1105, the method proceeds to step 1111.

At step 1111, the process is then tested to determine whether the process size is below a threshold and whether it is likely to remain at or close to its original size. In the various embodiments, the threshold can be fixed or variable. For the variable configuration, the threshold can be adjusted in a variety of ways. In some cases, the threshold can be adjusted by a user based on observation. In other configurations, the computing device, and specifically the MCCCP 1011, can be configured to monitor operation of processes over time and dynamically determine if and when the thresholds need to be adjusted. In some embodiments, the thresholds can be adjusted by process, by process type, by core, or by any other classification type.

In some cases, adjustments of the threshold can be performed preemptively. For example, in the case where a threshold for a process is unknown or is otherwise indeterminate, one or more cores can be configured with higher thresholds. A process can then be used with such cores to determine the appropriate threshold. Thereafter, the process can be shifted to a core which is a better match to the process and an appropriate threshold can be provided. Thus, over time, the processes, cores utilized, and corresponding thresholds can be "tuned" for the particular computing device configuration.

If the answer is no at step 1111, it proceeds to step 1115 and configures the cache as traditional 1115. If the answer is yes at step 1111, the method proceeds to step 1119 to use a dedicated slice for the process. At each of steps 1109, 1115, or 1119, the process is tagged according to the result.

In operation, the MCCCP 1011 can then be configured recognize the tags from specifically compiled program to separate slice processor eligible processes or to run several tests to choose the best configuration of a cache 1007 under processor 1006 and OS 1013 control. This process is further described with respect to FIG. 12.

Figure 12:
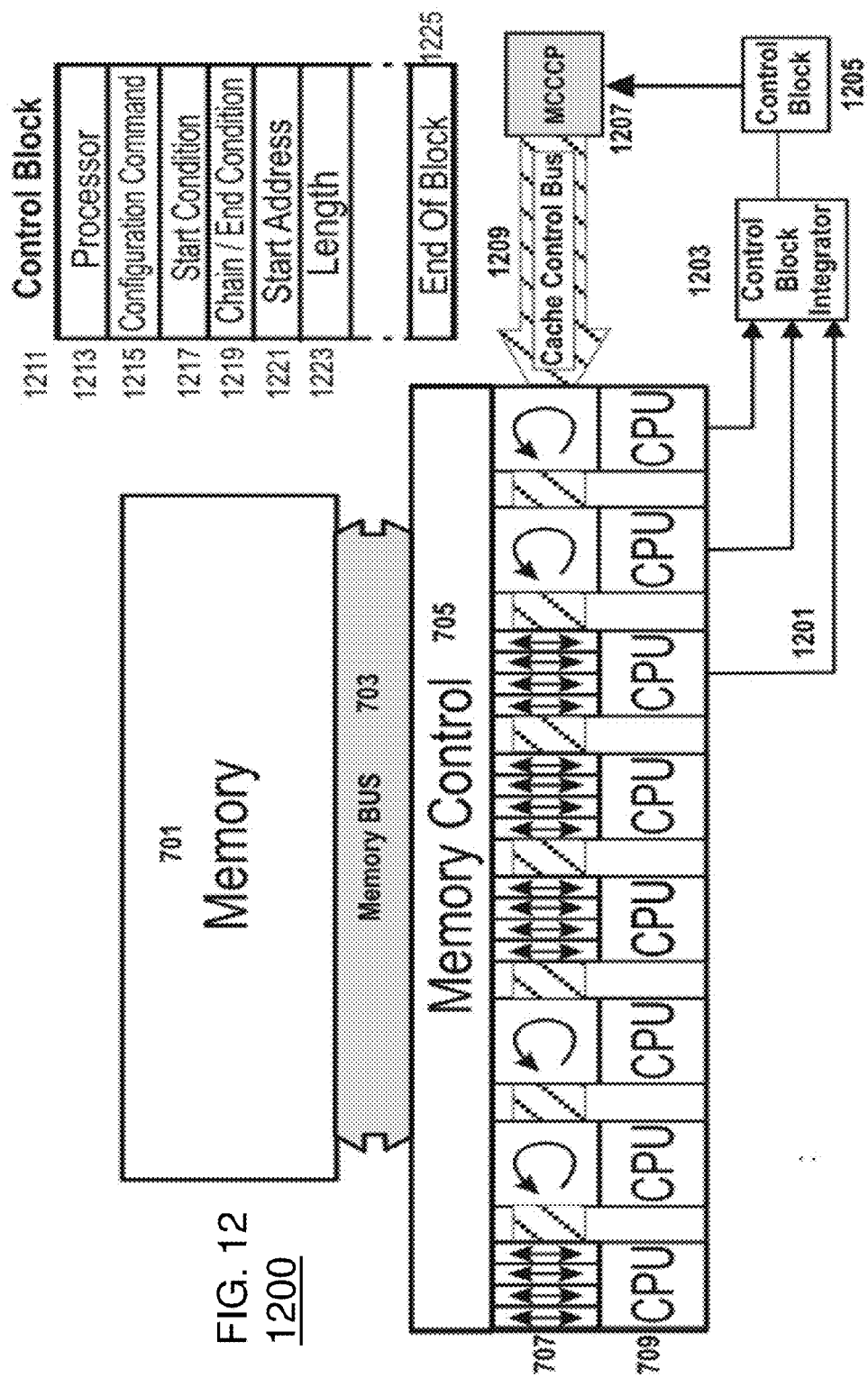
FIG. 12 is a schematic illustrating control of a multi-core processing system in accordance with an embodiments of the invention.

FIG. 12 is a schematic illustrating control of a multi-core processing system in accordance with an embodiments of the invention. As shown in FIG. 12, the MCCCP 1207 controls system 700 through cache control bus 1209 via control blocks. Control Block 1205 shows an example format for a control block that would function as the tags discussed above with respect to FIG. 11 that are embedded in the programs executed by some or all the CPUs 709. The CPUs 709 that deliver the results of the completed processes a Control Block Integrator 1203. At control block integrator 1203, the presentation of the control blocks can be prioritized or sequenced to the MCCCP 1207 per processor or arrival time, or other initialization or control block command to the MCCCP 1207.

In operation, the MCCCP 1207 interprets the control block 1205 and issues configuration commands to the caches memories 707 via the Cache Control Bus 1209. In particular embodiments, the Cache Control Block tags 1211 can provide, for example:

(1) The bus address of the processor either directly or as an offset of a previous operation (1213), (2) An interpreted Cache Configuration Command (1215) for the processor selected by parameter 1213, (3) The Start Condition field (1217) that defines the timing of the delivery operation, for example following a subsequent stop, pause, or branch condition.

(4) A Chain/End Condition (1219);

(5) A start address (1221); and (6) A length (1223); and (7) An end of block (1225).

The Chain/End Condition (1219) would define when the control block command would expire, for example after a particular instruction, or, depending on the value of the field in 1219, it may chain to an additional control block sourced from the instruction stream of the same of different CPUs 709, potentially as selected by the control block Integrator 1203, or contained in an extension of the control block 1211 following the Length parameter 1223. The start address of the segment of code in ram to be executed is in field 1221 and the length of the segment in Ram to be executed is in field 1223. Each CPU would have access to the Memory 701 and could fetch the desired code segments per the definition in the control block 1211. The Control block 1211 is therefore of variable length as defined by the End Of Block Field 1225.

Figure 13:
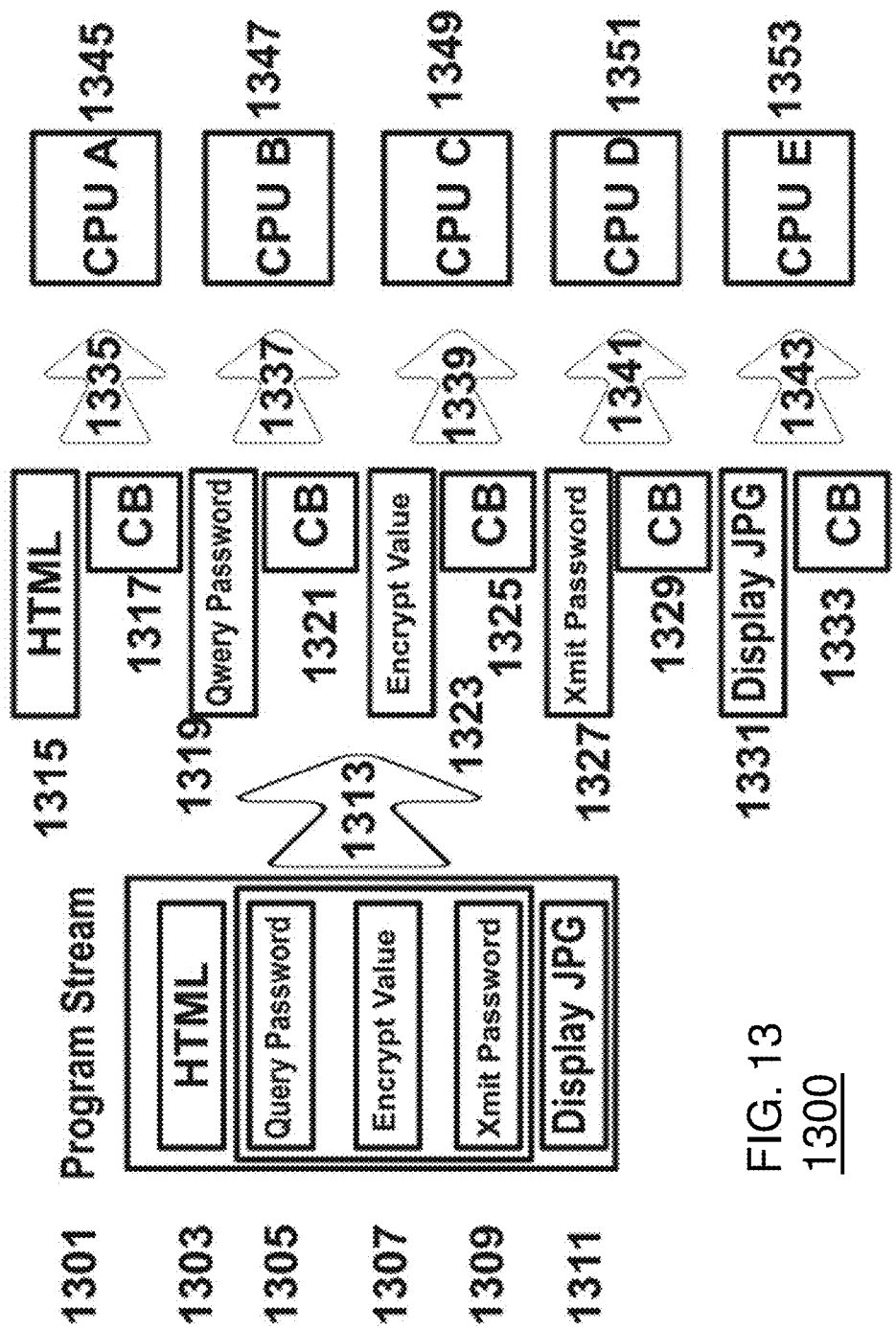
FIG. 13 shows a block diagram illustrating parsing and processing of a computer program in accordance with the various embodiments.

In practice, a system might parse a program stream, create control blocks, and distribute the operations to be executed to processors that would be configured per control blocks. Each processor has access to RAM and can fetch the defined code segments. This is illustrated with respect to FIG. 13. FIG. 13 shows a block diagram illustrating parsing and processing of a computer program in accordance with the various embodiments.

As shown in FIG. 13, a program stream 1301, could be executed sequentially by a single multipurpose processor, or it could be distributed to several processors as follows. For example, assume that code segment 1303 would produce an HTML page and for the purposes of this example might be small enough to be a slice. The Operating System or compiler 1313 would select this segment of code 1315 and create a control block 1317 that would configure 1335 CPU A's cache in slice mode and the CPU A would fetch the sequence of code 1315 from RAM for execution according to the parameters of the control block 1317.

Code segment 1305 that queries the user for a password, would be too large for a slice. The Operating System or compiler 1313 would create a control block 1321 to configure the cache in traditional mode to execute 1319. The control block would be delivered 1337 to CPU B 1347 and the segment 1319 would be fetched to be executed by CPU B 1347.

Similarly, the encryption function is small and re-iterative and is therefore suitable as a slice operation. Accordingly code segment 1307, through 1313 would yield 1323 and control block 1325 to be delivered by 1339 to CPU C 1349.

In similar fashion code segment 1309 becomes 1327 with control block 1329 by way of 1313 and is delivered 1341 to CPU D 1351; through 1313, code segment 1311 also becomes 1331 with associated control block 1333 and is delivered 1343 to CPU E 1353.

For the multicore environment discussed above, the present disclosure also contemplates that the compilation process that generates tags for applications and other programs can be optimized for a particular configuration of the computing device. For example, the program can be compiled so that it is optimized for the operating system, the number of cores, processing speed of cores, and sizes of the caches for the cores, just to name a few.

In such embodiments, the compiler can tag the programs such that processes can be divided amongst those in which a dedicated core is preferred and those in which multitasking is acceptable. As a result, the performance of a multicore computing device can be enhanced by dedicating at least one core to supporting multitasking and the remaining cores to slices. Thus, performance can be enhanced since the multitasking core is not required to switch between a slice mode and a multitasking mode by simply maintaining all multitasking tagged processes on the dedicated core.

In some embodiments, the tags can even indicate which of the processes preferring a dedicated core have a highest priority to be used in a slice mode or a highest priority for a certain environment. Thus, when computing devices share a same operating system but have a different number of cores, the tags can be utilized to determine how to allocate the cores and even "demote" some processes to the multitasking core.

Moreover, the tags can also indicate how to manage processes due to any other variations in computing device software and/or hardware. Thus, when computing devices vary with respect to any of the number of cores, processing speed of cores, sizes of the caches for the cores, and operating system types and/or versions, just to name a few, the tags can provide information to be used to manage the processes in view of such changes.

While such a use of tags enables flexibility of use of an application or other programs, the tags can also be used defensively. For example, in some embodiments, the tags can also be used to dissuade use of an application or other program on an "unapproved" or "unauthorized" computing device configurations. That is, the tags can, for example, specify specific CPU types, operating system types and/or versions, application types and/or versions, to name a few. Thus, the tags could be configured to force a non-optimal use of the cores for certain computing device configurations while providing for optimal use of the cores in other computing device configurations. Such a configuration can be utilized, for example, to enforce third party computing device configurations to comply with a required specification and/or prevent knock-offs of computing devices. Alternatively stated, the tags can function as a key to allow certain functionality only in certain environments. That is, if the configuration of the computing device fails to match the key, certain processes can be prevented from operating efficiently or even at all.

Although the foregoing discussion has primarily assumed a single device with multiple cores, the present disclosure contemplates that the slice processing of the various embodiments can also be applied across multiple devices to provide the multiple cores. This is illustrated in FIG. 14.

Figure 14:
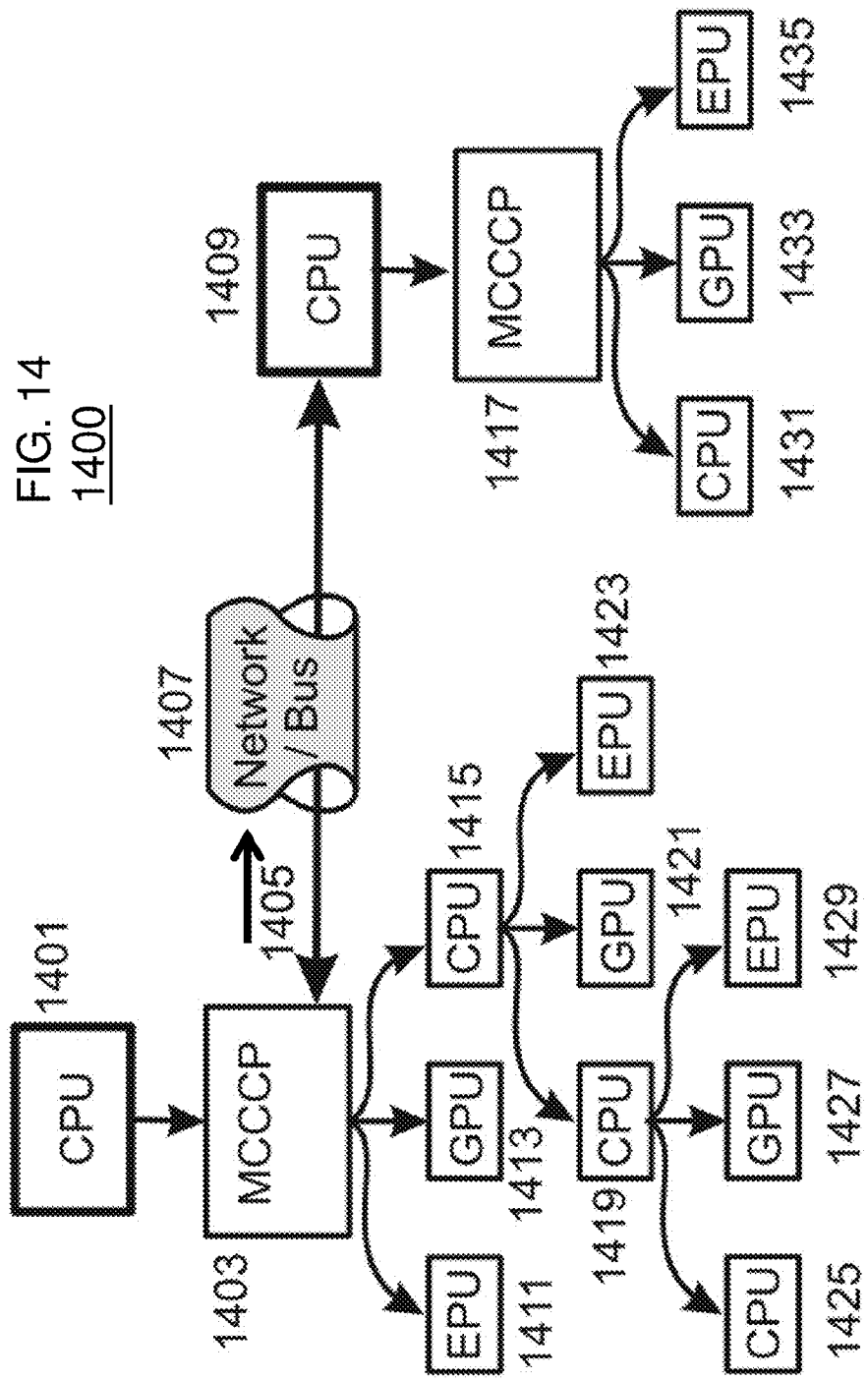
FIG. 14 schematically shows a hierarchical operation scheme in accordance with the various embodiments for control of dissimilar processors, remote operation, time coordinated peer operations, and independent uncoordinated threads.

FIG. 14 schematically shows a hierarchical operation scheme in accordance with the various embodiments for control of dissimilar processors, remote operation, time coordinated peer operations, and independent uncoordinated threads. As shown in FIG. 14, there is a hierarchical operation in that CPU 1401 controls MCCCP 1403, which in turn controls potentially dissimilar processing units. These include, but are not limited to: an Encryption Processing Unit (EPU) 1411, a Graphics Processing Unit (GPU) 1413 and Central Processing Unit (CPU) 1415. CPU 1415 controls, CPU 1419, GPU 1421, and EPU 1423 by creating or passing through control blocks (CBs) created by higher level CPUs, or preconfigured CBs stored and retrieved from Memory. Similarly CPU 1425, GPU 1427, or EPU 1429 can be controlled by a higher level hierarchical processor.

MCCCP 1403 may also control another CPU 1409 over a network or bus 1407 by passing control blocks 1405, which may in turn control a remote MCCCP 1417 and subordinate processing units 1431, 1433, 1435. In some embodiments, the MCCCP 1403 can be configured to manage multiple remote CPU/MCCCP instances. Such multiple remote instances can thus define a distributed or self-contained cloud system with one master system and multiple subordinate or slave systems. Moreover, each of the remote CPU/MCCCP instances can include its own subordinate systems.

However, the path 1405 of FIG. 14 can be bidirectional, as the master and slave relationship can vary with the operations defined.

In some embodiments, commands can be skewed in time by connectivity latencies. In such configurations, the control block may contain a synchronizing mechanism, such as a unified start time, with offsets when operations must be either synchronized simultaneously or sequentially. Thus, the ability to pass control blocks bi-directionally, or set them in memory for later retrieval, can also enable sequential operations.

For example, consider an example where video is compressed or decompressed (or encryption/decryption is defined) in slice processors and the whole of the operations is later assembled in a synchronized manner by such timing or sequencing controls within the control blocks. Such an ability to coordinate many simultaneous slice operations may have military or homeland defense implications in the creation or breaking of codes and images and filtering of messaging, for example.

Further, asynchronous operations of hierarchical processors are also possible. For example, maintenance operations (e.g. defrag, archive, backup, anti-malware) might continue in the background on one hierarchy, while applications are defined on another hierarchy. In a further mode, one hierarchy may have control blocks set 1405 initially for a fixed set of operations over a network or bus 1407, where operations proceed autonomously thereafter.

Although the discussion of the various embodiments above has focused primarily on managing operations based on differences between cores and associated caches, the present disclosure also contemplates that differences between other components of a computing device can also be factors in the management of tasks and processes.

For example, in the case of a system as in FIG. 7, 10, or 12, associated external cache, a backing store, or even a hard disk for a program can vary in size, performance, and other aspect. An MCCCP can consider these differences as additional factors in determining whether or not perform a task in a slice mode or whether one or more particular cores should perform tasks in a slice mode. This would allow efficient use of dissimilar memory modules and could also allow the continued use of lower performance memory as higher performance memory modules are added. Thus, existing components of the computing device can be used more efficiently and thus these components would have a longer lifespan of use.

The invention can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is suitable. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, (defining a computer program) which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various embodiments of the present invention have been described above, it should be understood that they have been presented by way of example only, and not limitation. Other changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Also, the terms "about", "substantially", and "approximately", as used herein with respect to a stated value or a property, are intend to indicate being within 20% of the stated value or property, unless otherwise specified above. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. A computer-based method for task processing in a computing device, the method comprising the steps of:
    identifying at least one program to be executed by a processor for performing at least one task;
    determining that a memory requirement for the at least one program does not exceed a capacity of a cache memory for the processor to perform at least one task;
    in response to determining that the memory requirement for the at least one program does not exceed the capacity of the cache memory, instructing the processor to enter into a slice mode from a current mode and execute the at least one program in the slice mode to perform the at least one task,
    wherein the slice mode comprises copying the at least one program from the at least one backing store memory to the cache memory and executing the at least one program to perform the at least one task by utilizing the at least one program copied to the cache memory.

2. The method of claim 1, further comprising:
    in response to determining that the memory requirement for the at least one program will exceed the capacity of the cache memory, instructing the processor to enter into a normal mode and execute the program in the normal mode to perform the at least one task, the normal mode comprising copying portions of the at least one program to the cache memory as needed for performing the at least one task.

3. The method of claim 2, wherein the determining comprises ascertaining that the memory requirement for the at least one program has historically remained smaller than the capacity of the cache memory.

4. The method of claim 2, wherein the determining comprises ascertaining that a probability that a memory requirement for the at least one program will exceed the capacity of the cache memory is less than a pre-defined threshold.

5. The method of claim 1, wherein the identifying comprises:
dividing the at least one task into a plurality of subtasks; and
performing the determining and instructing for each of the subtasks.

6. The method of claim 1, wherein the determining comprises:
detecting that the at least one program contains a tag indicating suitability of the at least one program for the slice mode.

7. A system comprising:
one or more processors, each of the processors comprising a cache memory;
at least one cache control configuration processor (CCCP);
a computer-readable medium, having stored thereon instructions for causing the at least one CCCP to perform the steps of:
identifying at least one program to be executed using the processors;
determining that a memory requirement for the at least one program to perform at least one task does not exceed a capacity of the cache memory for one of the processors;
in response to determining that the memory requirement for the at least one program does not exceed the capacity of the cache memory for the one of the processors, instructing the one of the processors to enter into a slice mode from a current mode and execute the at least one program in the slice mode to perform the at least one task,
wherein the slice mode comprises copying the at least one program from the at least one backing store memory to the cache memory and executing the at least one program by utilizing the at least one program copied to the cache memory.

8. The system of claim 7, wherein instructions further comprise additional instructions for causing the at least one CCCP to perform the steps of:
in response to determining that the memory requirement for the at least one program will exceed the capacity of the cache memory for the one of the processors, instructing the one of the processors to enter into a normal mode and execute the program in the normal mode to perform the at least one task, the normal mode comprising copying portions of the at least one program to the cache memory as needed for performing the at least one task.

9. The system of claim 8, wherein the determining comprises ascertaining that the memory requirement for the at least one program has historically remained smaller than the capacity of the cache memory of the one of the processors.

10. The system of claim 8, wherein the determining comprises ascertaining that a probability that a memory requirement for the at least one program will exceed the capacity of the cache memory of the one of the processors is less than a pre-defined threshold.

11. The system of claim 7, wherein the identifying comprises:
dividing the task into a plurality of subtasks; and
performing the determining and instructing for each of the subtasks.

12. The system of claim 7, wherein the determining comprises:
detecting that the at least one program contains a tag indicating suitability of the at least one program for the slice mode.

13. The system of claim 7, wherein the capacity of the cache memory is different among the one or more processors, and wherein the instructions further comprise additional instructions for causing the at least one CCCP to select the mode of the processors based on the capacity of the cache memory.

14. The system of claim 7, wherein the one or more processors comprise a plurality of processors coupled to the at least one CCCP over a network.

15. A non-transitory computer-readable medium having stored thereon code sections for managing task processing on a computing device, the code sections comprising a plurality of instructions for causing the computing device to perform the steps of:
identifying at least one program to be executed by a processor for performing a task;
determining that a memory requirement for the at least one program does not exceed a capacity of a cache memory for the processor to perform at least one task;
in response to determining that the memory requirement for the at least one program does not exceed the capacity of the cache memory, instructing the processor to enter into a slice mode from a current mode and execute the at least one program in the slice mode to perform the at least one task,
wherein the slice mode comprises copying the at least one program from the at least one backing store memory to the cache memory and executing the at least one program to perform the at least one task by utilizing the at least one program copied to the cache memory.

16. The non-transitory computer-readable medium of claim 15, the code sections comprising further instructions for causing the computing device to perform the step of:
in response to determining that the memory requirement for the at least one program will exceed the capacity of the cache memory, instructing the processor to enter into a normal mode and execute the program in the normal mode to perform the at least one task, the normal mode comprising copying portions of the at least one program to the cache memory as needed for performing the at least one task.

17. The non-transitory computer-readable medium of claim 16, wherein the determining comprises ascertaining that the memory requirement for the at least one program has historically remained smaller than the capacity of the cache memory.

18. The non-transitory computer-readable medium of claim 16, wherein the determining comprises ascertaining that a probability that a memory requirement for the at least one program will exceed the capacity of the cache memory is less than a pre-defined threshold.

19. The non-transitory computer-readable medium of claim 15, wherein the identifying comprises:
dividing the at least one task into a plurality of subtasks; and
performing the determining and instructing for each of the subtasks.

20. The non-transitory computer-readable medium of claim 15, wherein the determining comprises:

detecting that the at least one program contains a tag indicating suitability of the at least one program for the slice mode.

* * * * *